Figure 1:
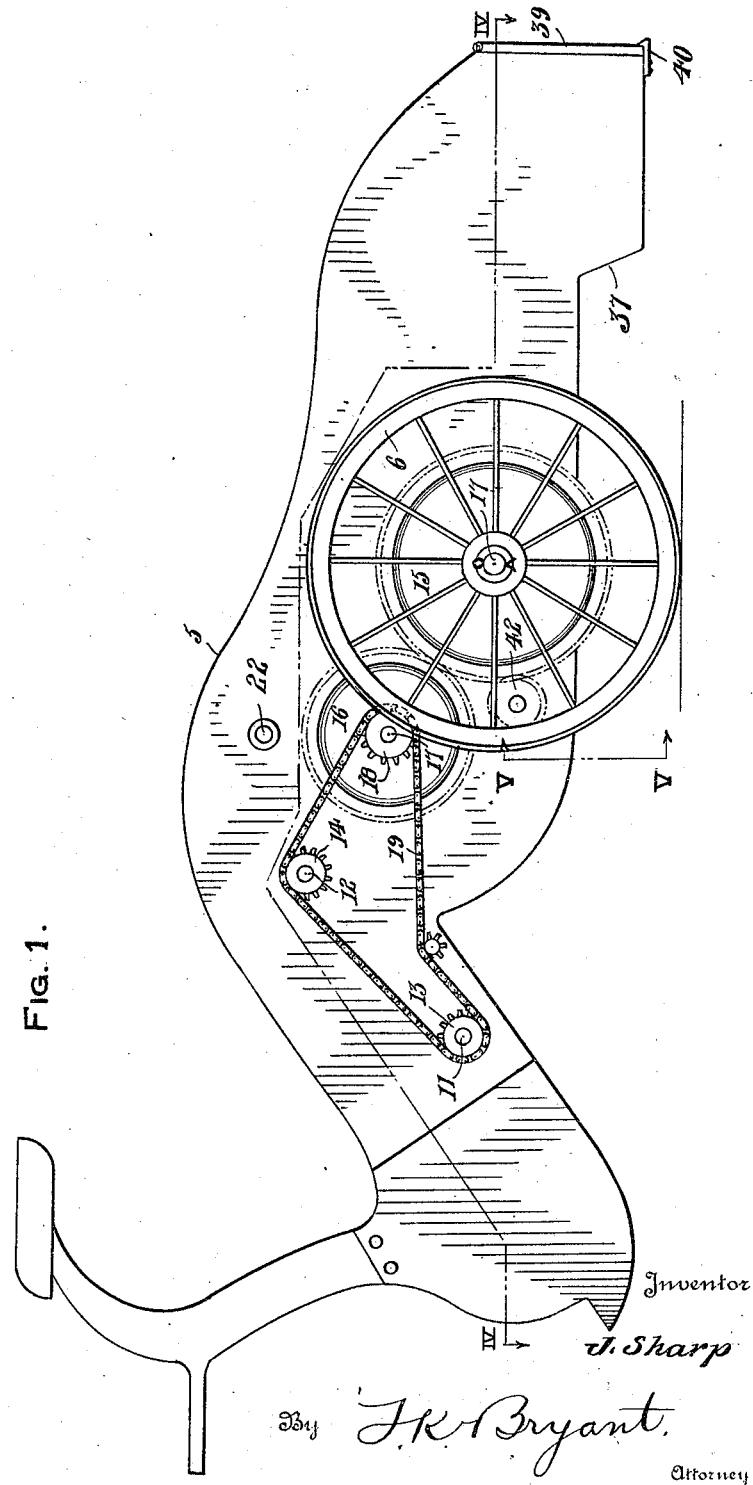

J. SHARP.
FARM MACHINERY.
APPLICATION FILED MAY 31, 1921.

1,418,981.

Patented June 6, 1922.
4 SHEETS—SHEET 1.

Inventor
J. Sharp
By J. K. Bryant.
Attorney

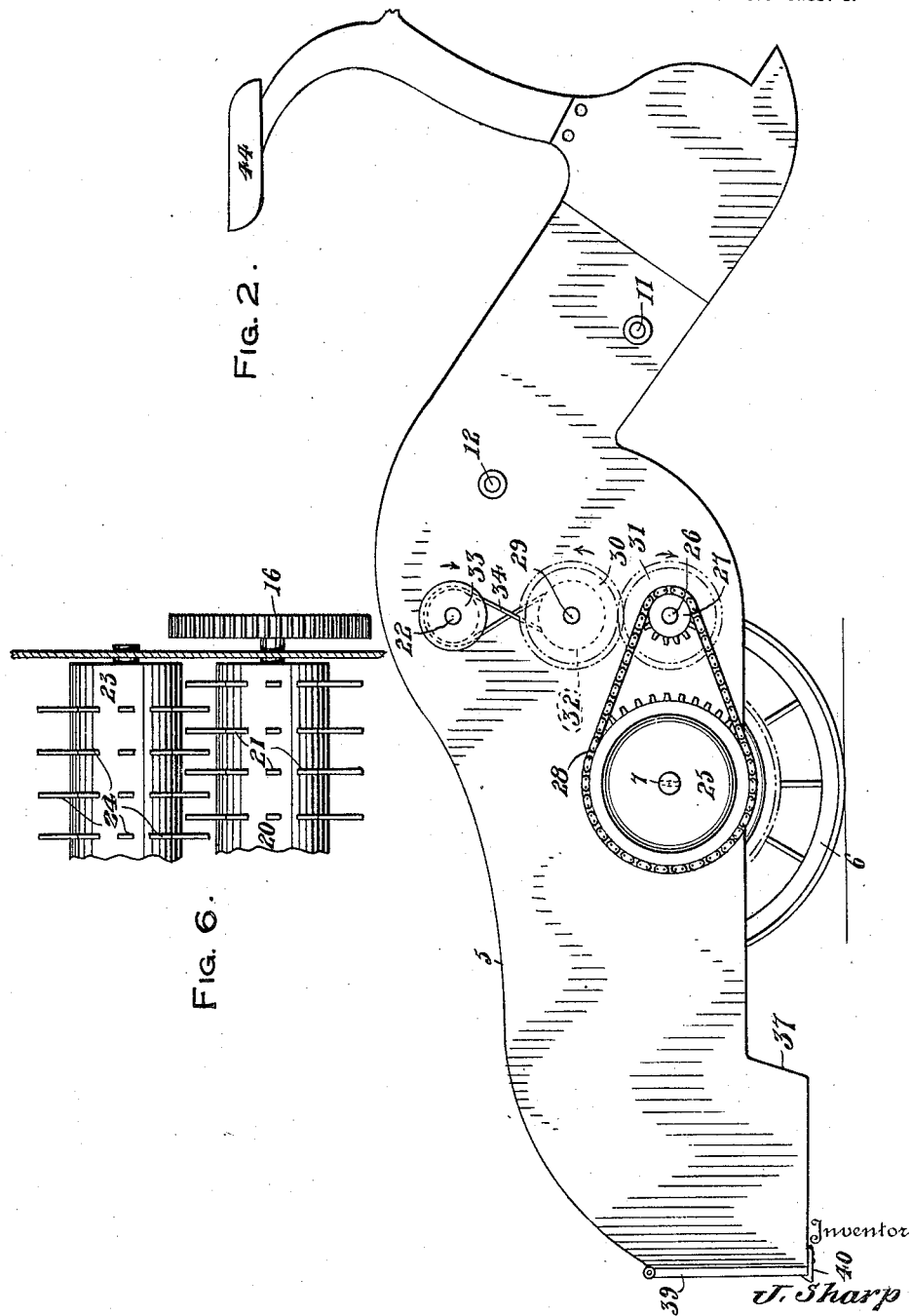

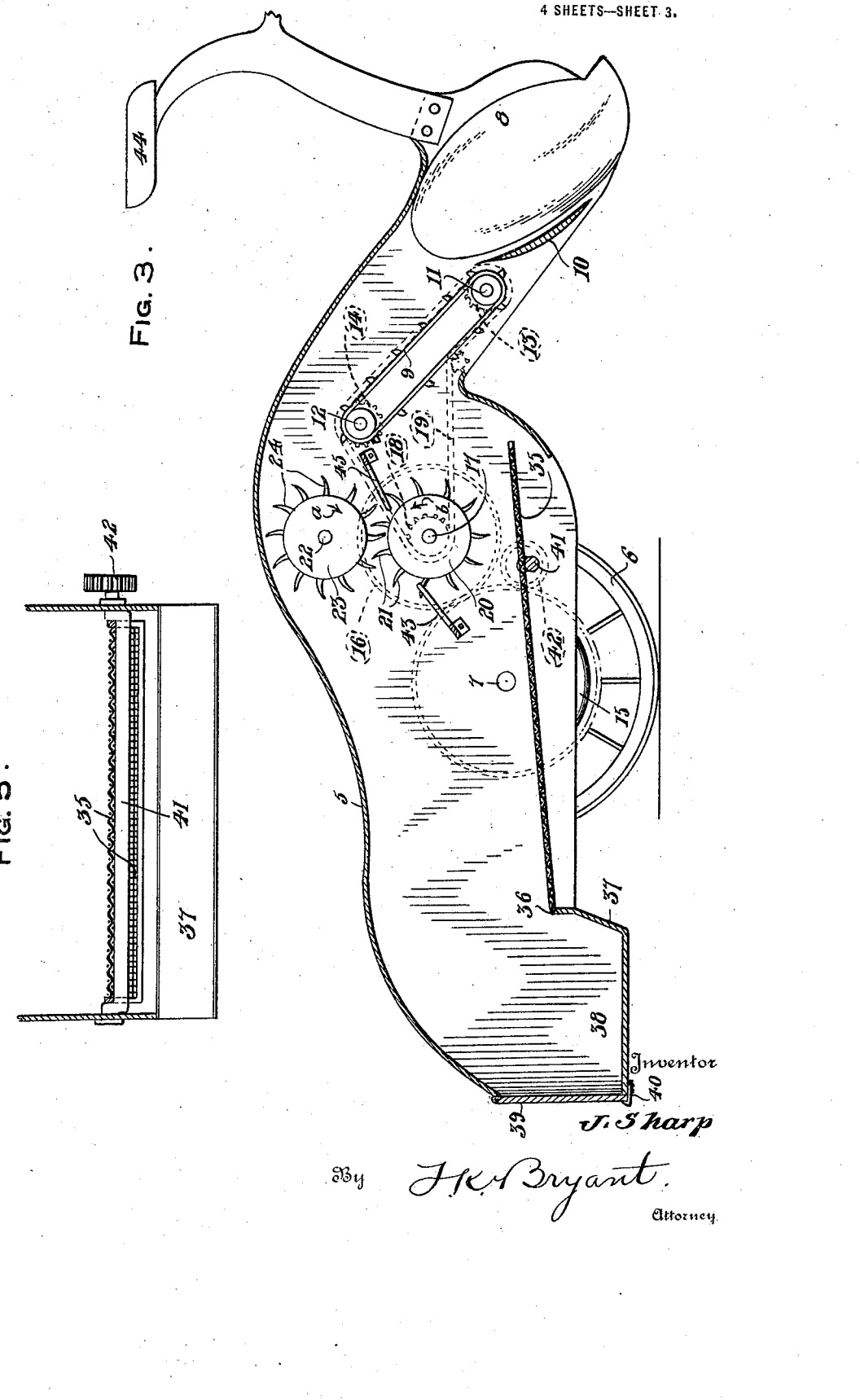

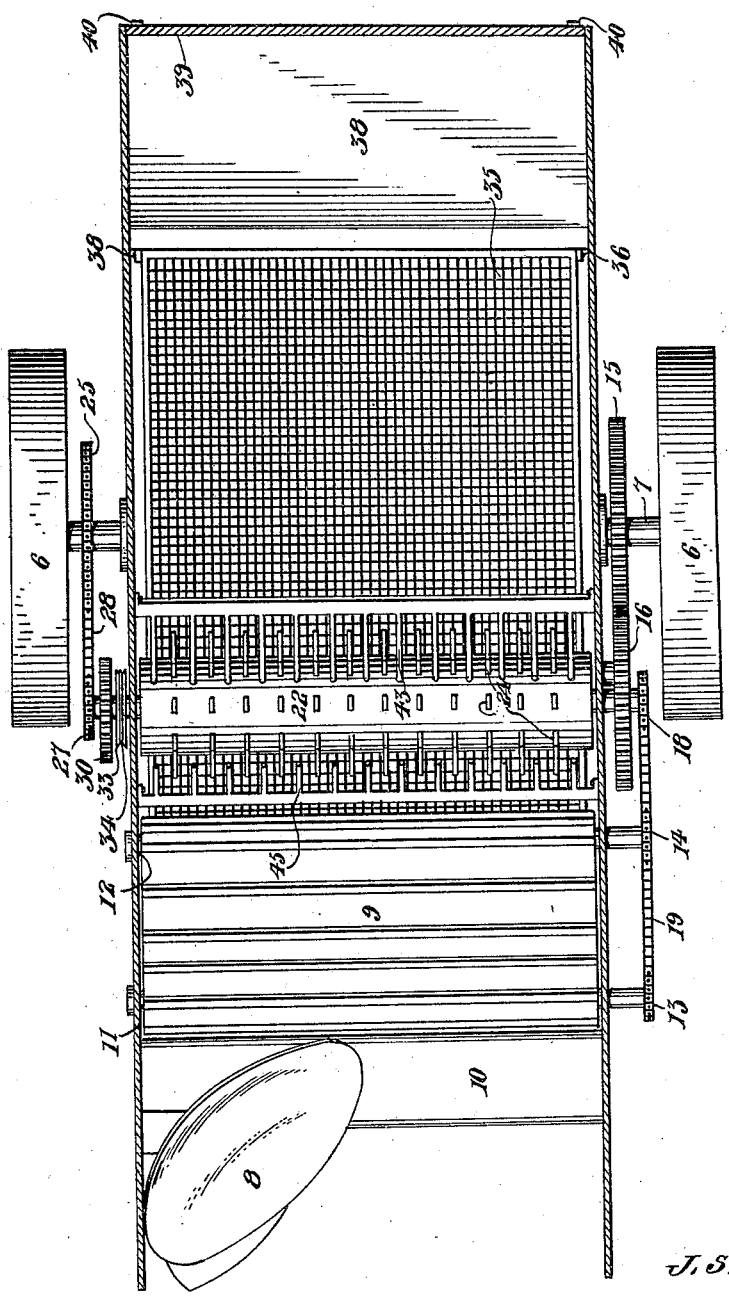

UNITED STATES PATENT OFFICE.

JACOB SHARP, OF FORT WILLIAM, ONTARIO, CANADA, ASSIGNOR OF ONE-FOURTH TO ANDREW SKILNYK AND ONE-FOURTH TO WASYL FEDAK, BOTH OF FORT WILLIAM, ONTARIO, CANADA.

FARM MACHINERY.

1,418,981.     Specification of Letters Patent.     Patented June 6, 1922.

Application filed May 31, 1921. Serial No. 473,989.

*To all whom it may concern:*

Be it known that I, JACOB SHARP, a citizen of Canada, residing at Fort William, in the Province of Ontario and Dominion of Canada, have invented certain new and useful Improvements in Farm Machinery, of which the following is a specification.

This invention relates to certain new and useful improvements in farm machinery and has particular reference to the provision of improved wheeled apparatus for plowing up soil and elevating the same to pulverizing mechanism and then delivering the same to a screening mechanism whereby the pulverized soil will be deposited upon the ground and refuse such as weeds and stalks as well as stones will be collected in a suitable receptacle for transportation off of the field.

The above operation is carried out by means of the novel construction and combination and arrangement of parts hereinafter more fully described and shown as to the preferred embodiment in the accompanying drawings wherein—

Figure 1 is a side elevational view of a machine constructed in accordance with the present invention, Figure 2 is a view similar to Fig. 1 looking at the opposite side of the machine, Figure 3 is a vertical longitudinal sectional view of the machine shown in Fig. 1, Figure 4 is a horizontal longitudinal sectional view taken upon line IV—IV of Fig. 1, Figure 5 is a vertical transverse sectional view taken along line V—V of Fig. 1, and Figure 6 is a fragmentary vertical sectional view showing the pulverizer rolls.

Referring more in detail to the several views, the present invention embodies a suitable vehicle body construction 5 preferably mounted upon substantially central opposed supporting wheels 6 which are fixed upon a rotatable axle 7, and forward traveling movement is imparted to the vehicle in any desired manner by means of a motor or by means of horse power through the use of driving mechanism or draft appliances not shown.

The forward end of the body 5 is preferably of inverted U-form in cross section and inclined, and a suitable plow element 8 is mounted in the forward end of this inclined portion of the body, while an inclined elevating conveyor 10 extends from the rear upper edge of the plow element 8 upwardly and a slight distance rearwardly as shown clearly in Fig. 3, a suitable transverse plate 9 being provided forwardly of the conveyor 9 and beneath the plow element 8 to insure passage of the soil to the conveyor 9 as the same is plowed upon forward movement of the machine. The conveyor 9 is preferably of the endless belt and bucket type wherein the endless member passes around suitable rollers provided upon the foot shaft 11 and the head shaft 12, both of which shafts are journaled in the sides of the body and which project through one of the sides of the body where they have suitable sprocket wheels 13 and 14 respectively fastened thereon. A relatively large spur gear 15 is secured upon the axle 7 adjacent one of the supporting wheels 6, and a second smaller spur gear 16 meshes with the gear 15 and is mounted upon a transverse shaft 17 which also has a sprocket wheel 18 fixed thereon whereby a chain 19 which is passed around the sprocket wheels 13, 14 and 18 may transmit power from the axle 7 through the gears 15 and 16 to the foot and head shafts 11 and 12 of the conveyor 9 upon forward movement of the machine.

The shaft 17 extends across the interior of the body 5 and has a suitable roller 20 fastened thereon between the sides of the body with a plurality of radially projecting bits 21 fixed thereto. A second transverse shaft similar to the shaft 17 and disposed directly above the latter as at 22, journaled in the sides of the body 5 and has a roller 23 fixed thereon between the sides of the body 5. radially extending bits 24 being also secured to the periphery of the roller 23 so that the bits 24 of the latter roller are situated between the bits 21 of the roller 20. A large sprocket wheel 25 is fixed upon the axle 7 adjacent the supporting wheel 6 which is at the opposite side of the body from that adjacent to which the gear 15 is positioned, and a stub shaft 26 is journaled forwardly of the sprocket wheel 25 and has a small sprocket wheel 27 secured thereon, a sprocket chain 28 being passed around the sprocket wheels 25 and 27 for transmitting rotation to the shaft 26. A second stub shaft 29 is journaled above the stub shaft 26 and has a spur gear 30 secured thereon which meshes with a smaller spur gear 31 secured upon the shaft 26, and a pulley 32 is also fastened upon the stub shaft 29 while a further pulley 33 is fastened upon the projecting end of the shaft 22. A twisted belt 34 passes around the pulleys 32 and 33 whereby rotation is imparted from the axle 7 through the gearing described to the upper roller 23 in the direction of the arrow $a$ of Fig. 3 upon forward movement of the vehicle, reverse rotation being then imparted to the lower roller 20 through the medium of the gears 15 and 16 as indicated by the arrow $b$ in said Fig. 3. A screen bottom 35 is provided for the body 5 from a point beneath the head shaft 12 of the conveyor to a point somewhat rearwardly of the axle 7 and beneath the rollers 20 and 23, and this screen bottom is hinged along its rear edge as at 36 to the top of the front wall 37 of a refuse collection receptacle 38 formed at the rear end of the body 5, which refuse receptacle is provided with an upwardly swinging tail gate or door 39 for convenient removal of the refuse whenever desired, suitable latching means 40 being provided for said gate.

A crank shaft 41 is journaled through the opposite sides of the body 5 and the forward portion of the screen body 35 rests upon the crank portion of this crank shaft 41, a projecting end of the crank shaft 41 having a small spur gear 42 secured thereon in mesh with the large spur gear 15. A small chute is arranged at an incline as at 43 rearwardly of the roller 20.

A suitable seat may be provided as at 44 at the forward end of the body for the operator of the device.

In operation, upon forward movement of the vehicle, the earth or soil is plowed by means of the plow element 8 and is then diverted onto the conveyor 9 by means of the plate 10. Through the gearing 15, 16, 19, etc., the conveyor is caused to elevate the soil to a chute 45 arranged at an incline rearwardly of the head shaft 12 whereby the soil is directed between the rollers 20 and 23 and through the medium of the bits 21 and 24, the soil is effectively broken up and delivered to the inclined chute 43, such operation being produced through the rotation of said rollers 20 and 23 as above described through the medium of the gearing 15 and 16, etc., and gear 25, 27, 32 and 33, etc. The soil, after being effectively broken up and thereby separated or loosened from stalks, stones and other refuse, is delivered upon the screen bottom 35, and as the latter is vertically reciprocated or oscillated through the rotation of the crank shaft 41, the soil is allowed to pass through said screen bottom onto the ground and the refuse is carefully fed rearwardly into the receptacle 38, the screen bottom 35 being arranged at an inclination to insure such feeding of the refuse to the receptacle 38. The mesh of the screen bottom 35 is such as is calculated proper to prevent the passage of the refuse therethrough while permitting free passage of the desirable soil therethrough.

When the desired plot of ground has been plowed and the soil broken up as well as the refuse separated therefrom, the machine is transported to a desired dump and upon opening the tail gate 39, the refuse may be conveniently discharged.

From the foregoing description, it is believed that the preferred embodiments of the present invention will be readily understood and appreciated by those skilled in the art.

Minor changes may be made in the invention without departing from the spirit and scope thereof as claimed.

What is claimed as new is:—

A machine for breaking soil and extracting refuse therefrom comprising a wheeled vehicle body having a plow element mounted at the forward end thereof, an elevating conveyor arranged to receive and elevate soil plowed and discharged by said plow element, pulverizing means arranged to receive the soil elevated by said conveyor and to effectively break up said soil, a screen bottom for said body arranged to receive the soil from the pulverizing means, means for actuating said screen bottom for causing the passage of the soil therethrough onto the ground while preventing passage of the refuse therethrough, said body being constructed to provide a refuse collecting and storing receptacle rearwardly of said screen bottom, said screen bottom being actuated and disposed so as to cause the refuse to be delivered into said receptacle, the supporting wheels of said body being fixed upon a rotatable axle, operating connections between said axle and said screen bottom, operating connections between said axle and said pulverizing means, means operatively connecting the actuating mechanism for the pulverizing means to said conveyor, said pulverizing means comprising superposed rollers provided with radially projecting bits, and operating mechanism for the pulverizing means causing reverse rotation of said rollers whereby rearward feeding of the soil is had for depositing said soil upon said screen bottom.

In testimony whereof I affix my signature in presence of two witnesses.

JACOB SHARP.

Witnesses:
A. H. DOWLER,
KATHLEEN DAY.